(12) United States Patent
Maki et al.

(10) Patent No.: US 8,042,886 B2
(45) Date of Patent: Oct. 25, 2011

(54) VEHICLE BRAKE SYSTEM

(75) Inventors: Kazuya Maki, Nagoya (JP); Koichi Kokubo, Nagoya (JP); Masayuki Naito, Takahama (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1070 days.

(21) Appl. No.: 11/689,029

(22) Filed: Mar. 21, 2007

(65) Prior Publication Data

US 2007/0284936 A1 Dec. 13, 2007

(30) Foreign Application Priority Data

Apr. 13, 2006 (JP) ................................. 2006-110477

(51) Int. Cl.
*B60T 8/64* (2006.01)
(52) U.S. Cl. ...................... 303/152; 303/115.4; 188/156
(58) Field of Classification Search .................. 303/152, 303/3, 10, 15, 155, 115.4, 115.5, 116.1, 116.3, 303/116.4, DIG. 10; 188/156, 158, 159
See application file for complete search history.

(56) References Cited

U.S. PATENT DOCUMENTS

| | | | | |
|---|---|---|---|---|
| 5,927,829 A * | 7/1999 | Saga et al. | ..................... | 303/152 |
| 6,120,115 A | 9/2000 | Manabe | | |
| 6,494,547 B2 * | 12/2002 | Higashimura et al. | ........ | 303/152 |
| 6,957,874 B2 * | 10/2005 | Hara et al. | ..................... | 303/152 |
| 2002/0014379 A1 * | 2/2002 | Oka et al. | .................. | 188/151 R |
| 2005/0269875 A1 | 12/2005 | Maki et al. | | |

FOREIGN PATENT DOCUMENTS

| | | |
|---|---|---|
| DE | 199 09 809 A1 | 9/1999 |
| DE | 10 2005 024 339 A1 | 1/2006 |
| JP | 2001-71880 A | 3/2001 |
| JP | 2002-255018 A | 9/2002 |
| JP | 2003-306137 A | 10/2003 |
| JP | 2006-021745 A | 1/2006 |

OTHER PUBLICATIONS

Office Action issued Mar. 30, 2010 by the German Patent Office in corresponding German Patent Application No. 10 2007 000 180.2-21, and English-language translation of Office Action.
Office Action issued Nov. 2, 2010 by the Japanese Patent Office in Japanese Patent Application No. 2006-110477, and English language translation of Official Action.

* cited by examiner

*Primary Examiner* — Xuan Lan Nguyen
(74) *Attorney, Agent, or Firm* — Buchanan Ingersoll & Rooney PC (57) ABSTRACT

A vehicle brake system is provided with a brake ECU serving as controlled hydraulic brake force control for executing a controlled hydraulic brake force control to decrease the rotational speed of an electric motor when at least both of a regenerative brake force and a controlled hydraulic brake force are being applied. The brake ECU decreases the rotational speed of the electric motor when the gradient of a target controlled hydraulic brake force being a controlled hydraulic pressure command value given to a hydraulic brake device is downhill or is not present. Thus, the pressured fluid supplied from a pump driven by the electric motor to be supplied to wheel cylinders of a vehicle is decreased to enhance the efficiency in utilizing the regenerative energy which an electric motor for driving the vehicle has in dependence on the stepping state of a brake pedal.

3 Claims, 7 Drawing Sheets

VEHICLE BRAKE SYSTEM

INCORPORATION BY REFERENCE

This application is based on and claims priority under 35 U.S.C. 119 with respect to Japanese Application No. 2006-110477 filed on Apr. 13, 2006, the entire content of which is incorporated herein by reference.

BACKGROUND OF THE INVENTION

1. Field of the Invention

The present invention relates to a vehicle brake system in which a total brake force to be applied to wheels in dependence on the braking operation state is attained by the sum of a hydraulic brake force given by a hydraulic brake device and a regenerative brake force given by a regenerative brake device.

2. Discussion of the Related Art

Heretofore, as described in Japanese unexamined, published patent application No. 2006-21745 (equivalent to United States Patent Publication No. US 2005/0269875 A1), there has been known a vehicle brake system, which is provided with a hydraulic brake device 11 for generating a base hydraulic brake force and a controlled hydraulic brake force applied to wheels 23 and a regenerative brake device 12 for generating a regenerative brake force applied to the wheels 23 in correspondence to the braking operation state. In the hydraulic brake device 11, a base hydraulic pressure is generated by a master cylinder 25 in dependence on the braking operation, and the generated base hydraulic pressure is applied to wheel cylinders 30 of the respective wheels 23 which communicate with the master cylinder 25 through oil passages each with a fluid pressure control valve 32 thereon, to generate the base hydraulic brake force on each wheel 23. Further, an electric motor 39 is driven in response to a controlled hydraulic pressure command value to drive pumps 38 which are provided in combination with hydraulic control valves 32 for generating the controlled hydraulic pressures, and the controlled hydraulic pressures are supplied to the wheel cylinders 30 of the respective wheels 23 to apply the controlled hydraulic brake force to the wheels 23.

Figure 8:
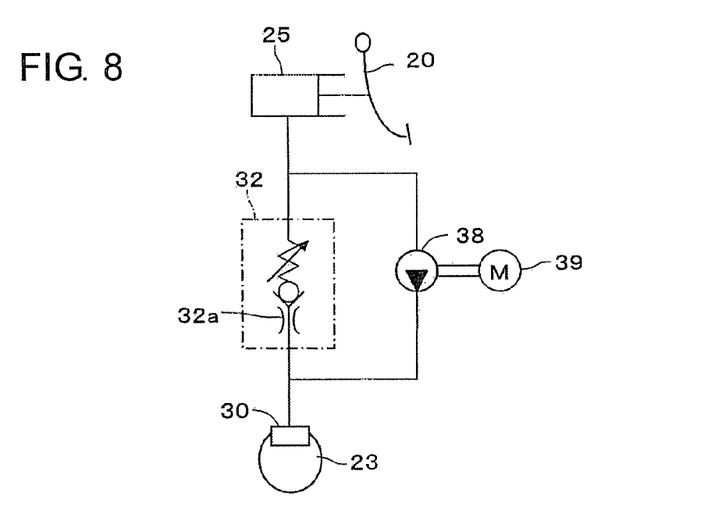
FIG. 8 is a simplified representation of the oil passages shown in FIG. 2.

The fluid pressure control valves 32 are electromagnetic valves each of which can be switched selectively to a pressure difference state that a controlled pressure difference is generated between the master cylinder 25 side and the wheel cylinder 30 side and to a direct communication state that the controlled pressure difference is not generated. As shown in FIG. 8 schematically showing oil passages of a vehicle brake system, each hydraulic control valve 32 has a small-diameter valve hole 32a, which serves as throttle hole when the wheel cylinder pressure is higher than the master cylinder pressure. In FIG. 8, members identical to those in the aforementioned Japanese application are designated by the same reference numerals.

In the vehicle brake system, as shown in FIG. 5 of the aforementioned Japanese application, there occurs a situation wherein at least both of a regenerative brake force and a controlled hydraulic brake force are given. More specifically, a brake ECU 13 detects the fluctuation of the regenerative brake force which is actually generated by the regenerative brake device 12. When detecting the fluctuation, the brake ECU 13 drives a pump 38 of the hydraulic brake device 11 and switches each hydraulic control valve 32 to the pressure difference state to generate a controlled hydraulic pressure by controlling the pressure difference, whereby a controlled hydraulic brake force depending on the controlled hydraulic pressure is generated on each wheel 23 to compensate for a deficiency in the regenerative brake force caused by the detected fluctuation.

In the vehicle hydraulic brake system described in the aforementioned Japanese application, not only the electric motor 39 is driven to drive the pumps 38 but also the hydraulic control valves 32 are switched to the pressure difference state to control the pressure difference in executing the control for applying the controlled hydraulic brake force.

However, when the pumps 38 are driven with a command being issued to make the controlled pressure difference across each hydraulic control valve 32 zero (i.e., with the commanded pressure difference being zero), the pressure on the wheel cylinder 30 side of each hydraulic control valve 32 rises higher than that on the master cylinder 25 side of the hydraulic control valve 32. This causes the valve hole 32a of each hydraulic control valve 32 to work as throttle hole, whereby a pressure difference (drive pressure difference) is generated between the master cylinder 25 side and the wheel cylinder 30 side of the hydraulic control valve 32. Further, this drive pressure difference is also generated when another command has been issued to each hydraulic control valve 32 to make the controlled pressure difference a predetermined pressure.

Figure 9:
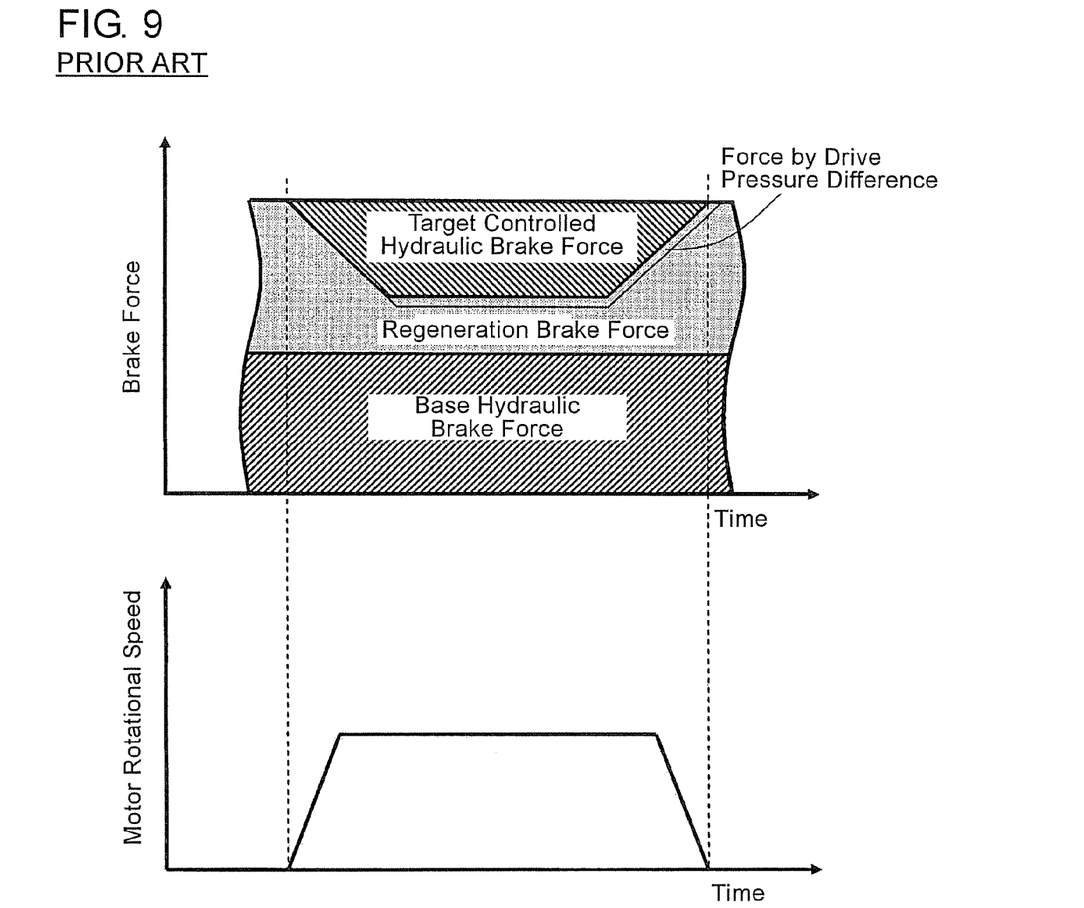
FIG. 9 is a time chart showing the relation between the composition of brake forces during a cooperative regenerative braking and the stroke of a brake pedal in the prior art.

Accordingly, as shown in FIG. 9, the rotation of the electric motor 39 at a constant rotational speed causes the pumps 38 to be driven, and the drive pressure difference is thus generated, whereby each wheel 23 is given a brake force which is made up by adding a brake force depending on the drive pressure difference to a controlled hydraulic brake force set as target. This results in reducing the brake force which the regenerative brake force should undertake in dependence on the operation state of a brake pedal, by that corresponding to the drive pressure difference, and thus, a problem arises in that the efficiency in utilizing the regenerative energy is lowered.

SUMMARY OF THE INVENTION

Accordingly, it is a primary object of the present invention to provide an improved vehicle brake system capable of enhancing the efficiency in utilizing regenerative energy by controlling the rotational speed of an electric motor for a hydraulic brake device when at least both of a regenerative brake force and a controlled hydraulic brake force are applied.

Briefly, according to the present invention, there is provided a vehicle brake system, which comprises a hydraulic brake device for generating by a master cylinder a base hydraulic pressure corresponding to a braking operation and for applying the generated base hydraulic pressure to wheel cylinders of wheels which are connected to the master cylinder through fluid passages having a hydraulic control valve thereon so that a base hydraulic brake force is generated on the wheels, the hydraulic brake device being provided also for driving a pump by driving an electric motor in dependence on a controlled hydraulic pressure command value to generate and apply a controlled hydraulic pressure to the wheel cylinders so that a controlled hydraulic brake force is generated on the wheels; a regenerative brake device for generating a regenerative brake force corresponding to the state of the braking operation, on any of the wheels; and controlled hydraulic brake force control means for decreasing the rotational speed of the electric motor when at least both of the regenerative brake force and the controlled hydraulic brake force are applied.

With this construction, when at least both of the regenerative brake force and the controlled hydraulic brake force are applied, the controlled hydraulic brake force control means decreases the rotational speed of the electric motor. Therefore, without adding a brake force corresponding to a drive pressure difference to the controlled hydraulic brake force set as target or by suppressing the added brake force corresponding to the drive pressure difference to be as small as possible, the controlled hydraulic brake force to be applied actually can be applied with a targeted brake force or with a brake force as close as possible to the targeted brake force. Accordingly, since the regenerative brake force can be applied with a brake force which it should undertake in dependence on the operation state of a brake pedal or with that which is as close as possible to such a brake force, the efficiency in utilizing the regenerative energy can be enhanced when at least both of the regenerative brake force and the controlled hydraulic brake force are applied.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
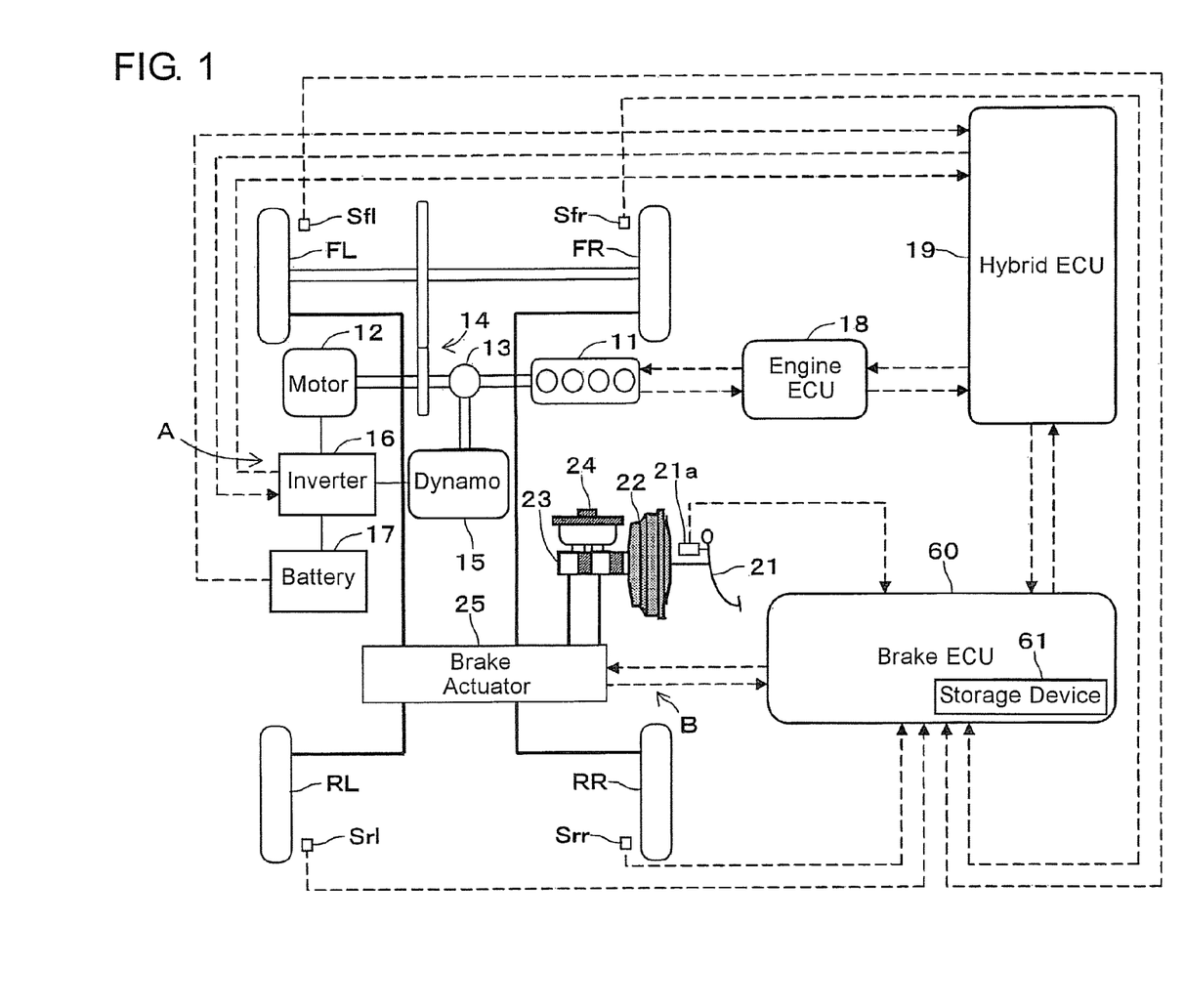
FIG. 1 is a schematic block diagram of a vehicle incorporating a vehicle brake system in one embodiment according to the present invention.
Figure 2:
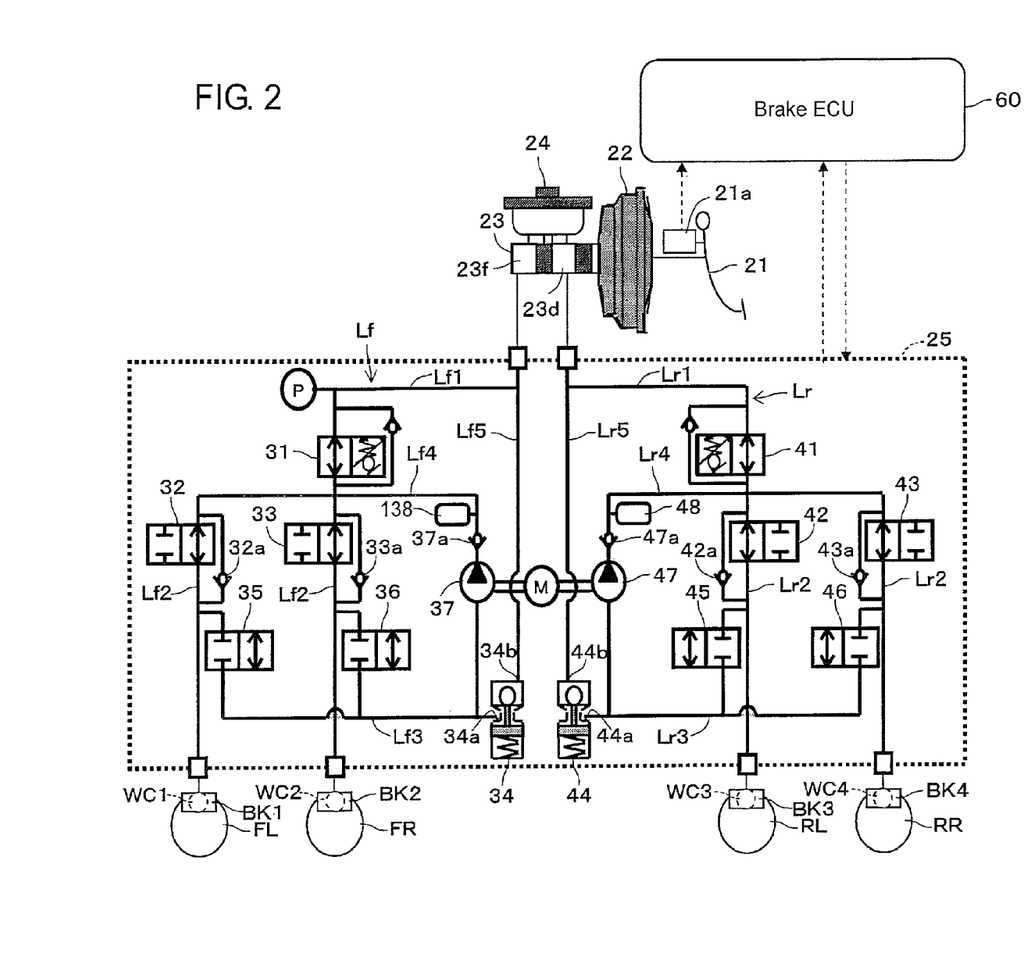
FIG. 2 is a circuit diagram of a hydraulic brake device incorporated in the system shown in FIG. 1.

A vehicle brake system in one embodiment according to the present invention will be described hereinafter with reference to the accompanying drawings, wherein the system is applied to a hybrid vehicle. FIG. 1 is a schematic view showing the construction of the hybrid vehicle, and FIG. 2 is a schematic view showing the construction of a hydraulic brake device. As shown in FIG. 1, the hybrid vehicle is a vehicle of the type that drives drive wheels such as, for example, left and right front wheels FL, FR by a hybrid system. The hybrid system is a power train which uses power sources of two kinds including an engine 11 and an electric motor 12 in combination. In the case of the present embodiment, the system is a parallel hybrid system of the type that directly drives the wheels by both of the engine 11 and the motor 12. Other types of the hybrid system include a serial hybrid system, wherein an electric motor serves to drive wheels while an engine serves as a supply source of electric power to the motor.

The hybrid vehicle incorporating the parallel hybrid system is provided with the engine 11 and the electric motor 12. The driving power of the engine 11 is transmitted to drive wheels (left and right front wheels FL, FR in the present embodiment) through a power divider mechanism 13 and a power transmission mechanism 14. The driving power of the electric motor 12 is transmitted to the drive wheels through the power transmission mechanism 14. The power divider mechanism 13 appropriately divides the driving power of the engine 11 into a vehicle driving power and a generator or dynamo driving power. The power transmission mechanism 14 appropriately combines the driving powers of the engine 11 and the electric motor 12 in dependence on the traveling condition to transmit the combined driving power to the drive wheels. The power transmission mechanism 14 is constructed to adjust the ratio between the driving powers transmitted from the engine 11 and the electric motor 12 in a range of 0:100 to 100:0. The power transmission mechanism 14 has a variable speed function.

The electric motor 12 assists the output of the engine 11 to enhance the driving power on one hand and generates electricity to charge a battery 17 during the braking operation of the vehicle on the other hand. A generator or dynamo 15 generates electricity by being driven by the output of the engine 11 and functions as a starter at the time of engine start. The electric motor 12 and the dynamo 15 are electrically connected to an inverter 16. The inverter 16 is electrically connected to the battery 17 as a direct-current power supply. The inverter 16 converts the alternate-current voltage inputted from the electric motor 12 and the dynamo 15 into direct-current voltage to supply the same to the battery 17 or conversely converts the direct-current voltage from the battery 17 into the alternate-current voltage to supply the same to the electric motor 12 and the dynamo 15.

In the present embodiment, the motor 12, the inverter 16 and the battery 17 constitute a regenerative brake device A, which causes any of the respective wheel FL, FR, RL, RR (the left and right front wheels FL, FR driven by the electric motor 12 as a drive power source in the present invention) to generate a regenerative brake force in dependence on the brake operation state detected by brake operation state detection means.

The brake operation state is the operation state of a brake pedal 21 and can be detected in the form of, e.g., either or the combination of a stroke amount of the brake pedal 21, a stepping force on the brake pedal 21, a master cylinder pressure correlating with the stepping force, and the like. The brake operation state detection means is for detecting the brake operation state and is constituted by a pedal stroke sensor 21a for detecting the stroke amount of the brake pedal 21, a pressure sensor P for detecting the master cylinder pressure, and the like.

The engine 11 is controllable by an engine ECU (Electronic Control Unit) 18, which regulates the rotational speed of the engine 11 by outputting an opening command to an electronic control throttle (not shown) in accordance with an engine output demand value from a hybrid ECU (Electronic Control Unit) 19 referred to later.

The hybrid ECU 19 is connected to the inverter 16 to be able to communicate with each other. The hybrid ECU 19 derives a required engine power, an electric motor torque and a dynamo torque from the accelerator opening degree and the shift position (calculated from a shift position signal inputted from a shift position sensor (not shown)) and transmits a derived engine power demand value to the engine ECU 18 to control the driving power of the engine 11. The hybrid ECU 19 controls the electric motor 12 and the dynamo 15 through the inverter 16 in accordance with a derived electric motor torque demand value and a derived dynamo torque demand value. Further, the hybrid ECU 19 is connected to the battery 17 and monitors the charging state, charging current and the like of the battery 17. Further, the hybrid ECU 19 is also connected to an accelerator opening degree sensor (not shown) which is built in a gas or accelerator pedal (not shown) for detecting the accelerator opening degree of the vehicle, and inputs an accelerator opening degree signal from the accelerator opening degree sensor.

Further, the hybrid vehicle is provided with a hydraulic brake device B for applying hydraulic brake forces directly on the respective wheels FL, FR, RL, RR to brake the vehicle. As shown mainly in FIG. 2, the hydraulic brake device B is of the construction that a master cylinder 23 generates a base hydraulic pressure corresponding to the brake operation state made by the stepping of the brake pedal 21, that the generated base hydraulic pressure is applied directly to wheel cylinders WC1-WC4 of the respective wheels FL, FR, RL, RR which are connected to the master cylinder 23 through oil passages Lf, Lr respectively having hydraulic control valves 31, 41 thereon, to make each wheel FL, FR, RL, RR generate a base hydraulic brake force corresponding to the base hydraulic pressure, and that controlled hydraulic pressures which are generated, independently of the base hydraulic pressure generated in dependence on the braking operation state, by driving the pump 37, 47 and by controlling the hydraulic control valves 31, 41 are applied to the wheel cylinder WC1-WC4 of the respective wheels FL, FR, RL, RR to make each wheel FL, FR, RL, RR generate a controlled hydraulic brake force.

The hydraulic brake device B is composed of a vacuum booster 22 which is a booster device for assisting and boosting (enhancing) a brake operation force given by the stepping operation of the brake pedal 21 upon receiving the intake vacuum of the engine 11 on a diaphragm thereof, a master cylinder 23 for generating brake hydraulic (oil) pressure which is the base hydraulic pressure depending on the brake operation force (i.e., the operation state of the brake pedal 21) boosted by the vacuum booster 22, to supply the brake hydraulic pressure to the wheel cylinders WC1-WC4, a reservoir tank 24 storing brake fluid for replenishing the same to the master cylinder 23, and a brake actuator (controlled hydraulic brake force generating device) 25 provided between the master cylinder 23 and the wheel cylinders WC1-WC4 for generating controlled hydraulic pressures. The brake pedal 21, the vacuum booster 22, the master cylinder 23 and the reservoir tank 24 constitute a base hydraulic brake force generating device.

A brake piping system of the hydraulic brake device B in the present embodiment takes a piping form of front-rear separation, and first and second hydraulic chambers 23d, 23f of the master cylinder 23 are connected respectively to oil passages Lr and Lf, as shown in FIG. 2. The oil passage Lr makes the first hydraulic chamber 23d communicate with the wheel cylinders WC3, WC4 of the left and right rear wheels RL, RR, while the oil passage Lf makes the second hydraulic chamber 23f communicate with the wheel cylinders WC1, WC2 of the left and right front wheels FL, FR.

When supplied with hydraulic pressure (the sum of the base hydraulic pressure and the controlled hydraulic pressure) from the master cylinder 23 and the pumps 37, 47 through the oil passages Lf, Lr, respective brake means BK1-BK4 which are provided in correspondence respectively to the wheel cylinders WC1-WC4 are operated to apply a hydraulic brake force (the sum of a base hydraulic brake force and a controlled hydraulic brake force) to each of the wheels FL, FR, RL, RR. As each brake means BK1-BK4, there is used a disc brake, a drum brake or the like, wherein friction members such as, e.g., brake pads, brake shoes or the like restrict the rotation of a disc rotor, a brake drum or the like provided bodily with each wheel.

Next, the brake actuator 25 will be described in detail with reference to FIG. 2. The brake actuator 25 is generally well-known in the art and is constructed by packaging within one case the hydraulic control valves 31, 41, pressure increasing control valves 32, 33, 42, 43 and pressure reducing control valves 35, 36, 45, 46, pressure regulation reservoirs 34, 44, the pumps 37, 47, an electric motor M and the like. The pressure increasing control valves 32, 33, 42, 43 and the pressure reducing control valves 35, 36, 45, 46 operate as ABS control valves.

First of all, the construction for a front-wheel hydraulic system of the brake actuator 25 will be described. The oil passage Lf is provided with the hydraulic control valve 31 constituted by a pressure difference control valve. The hydraulic control valve 31 is controllable by a brake ECU (Electronic Control Unit) 60 selectively to a communication state and a pressure difference state. The hydraulic control valve 31 is normally held in the communication state, but when brought into the pressure difference state, is able to hold the oil passage Lf2 on the side of the wheel cylinders WC1, WC2 to be higher in pressure by a predetermined controlled pressure difference than the oil passage Lf1 on the side of the master cylinder 23. The controlled pressure difference is regulatable in dependence on a control current from the brake ECU 60. Further, the hydraulic control valve 31 has a small-diameter valve hole (the same construction as a valve hole 32a shown in FIG. 8). When the pressure on the wheel cylinder side becomes higher by a predetermined pressure and over than that on the master cylinder side, the valve hole of the hydraulic control valve 31 serves as a throttle hole, whereby a pressure difference (drive pressure difference) is generated between the master cylinder side and the wheel cylinder side of the hydraulic control valve 31.

The oil passage Lf 2 is branched to two branch passages Lf2, Lf2. One of the branch passages is provided with the pressure increasing control valve 32 for controlling the pressure increase of brake hydraulic pressure supplied to the wheel cylinder WC1 in a pressure increase mode under the ABS control, and the other branch passage is provided with the pressure increasing control valve 33 for controlling the pressure increase of brake hydraulic pressure supplied to the wheel cylinder WC2 in the pressure increase mode under the ABS control. Each of the pressure increasing control valves 32, 33 is constituted as a two-position valve which is controllable by the brake ECU 60 to be brought selectively into either of the communication and blocked states. Then, when controlled to be held in the communication state, the pressure increasing control valves 32, 33 are able to apply the base hydraulic pressure from the master cylinder 23 or/and a controlled hydraulic pressure generated by controlling the pump 37 and the hydraulic control valve 31, to the respective wheel cylinders WC1, WC2. Further, the pressure increasing control valves 32, 33 are able to perform the ABS control in cooperation with the pressure reducing control valves 35, 36 and the pump 37.

At the time of an ordinary or normal braking wherein the ABS control is not performed, the pressure increasing control valves 32, 33 are controlled to be continually in the communication state. Safety valves 32a, 33a are provided in parallel relation respectively with the pressure increasing control valves 32, 33 and operate to return brake fluids from the wheel cylinders WC1, WC2 sides to the reservoir tank 24 when the brake pedal 21 is released under the ABS control.

Further, the oil passages Lf2, Lf2 between the pressure increasing control valves 32, 33 and the respective wheel cylinders WC1, WC2 communicate with a reservoir hole 34a of the pressure regulation reservoir 34 through an oil passage Lf3 branched to be connected to the oil passages Lf2, Lf2. Branched portions of the oil passage Lf3 respectively have arranged thereon the pressure reducing control valves 35, 36 each of which is controllable by the brake ECU 60 to be brought selectively into either of communication and blocked states. The pressure reducing control valves 35, 36 are continually held in the blocked state at the time of the normal braking state (at the time of the ABS not operating), but when brought into the communication state timely or intermittently, serve to drain the brake fluids through the oil passage Lf3 to the pressure regulation reservoir 34, so that the brake hydraulic pressures in the wheel cylinders WC1, WC2 are controlled to prevent the wheels from tending to lock.

Further, the pump 37 is arranged together with a safety valve 37a on an oil passage Lf4 which connects the oil passage Lf2 between the hydraulic control valve 31 and the pressure increasing control valves 32, 33, to the reservoir hole 34a of the pressure regulation reservoir 34. Additionally, an oil passage Lf5 is provided to connect a reservoir hole 34b of the pressure regulation reservoir 34 to the master cylinder 23 through the oil passage Lf1. The pump 37 is drivable by the electric motor M responsive to a command from the brake ECU 60. In a pressure reducing mode under the ABS control, the pump 37 draws brake fluids in the wheel cylinders WC1, WC2 and the brake fluid stored in the pressure regulation reservoir 34 to return the drawn brake fluids to the master cylinder 23 through the hydraulic control valve 31 held in the communication state. Further, in generating a controlled hydraulic pressure for controlling the behavior of the vehicle to a stable state under an ESC (Electronic Stability Control), a traction control, a brake assist control or the like, the pump 37 draws the brake fluid within the master cylinder 23 through the oil passages Lf1, Lf5 and the pressure regulation reservoir 34 and discharges the drawn brake fluid to the wheel cylinders WC1, WC2 through the oil passages Lf4, Lf2, Lf2 and the pressure increasing control valves 32, 33 held in the communication state to apply a controlled hydraulic pressure to the wheel cylinders WC1, WC2 so that the hydraulic control valve 31 having been switched to the pressure difference state generates the controlled hydraulic pressure. For mitigation of pulsations in the brake fluid discharged from the pump 37, a damper 138 is arranged on the oil passage Lf4 at an upstream side of the pump 37.

Further, the oil passage Lf1 is connected to the aforementioned pressure sensor P for detecting the master cylinder pressure which is the brake hydraulic pressure within the master cylinder 23. The detection signal from the pressure sensor P is transmitted to the brake ECU 60. The pressure sensor P may be connected to an oil passage Lr1 for a rear-wheel hydraulic system. The master cylinder pressure represents one of the brake operation states.

Another brake operation state is represented by the pedal stroke of the brake pedal 21. The pedal stroke can be detected by a pedal stroke sensor 21a provided to be operated by the brake pedal 21. The detection signal is transmitted to the brake ECU 60. FIGS. 1 and 2 illustrate both of the pressure sensor P and the pedal stroke sensor 21a. However, in the present embodiment, only the pressure sensor P is incorporated. Instead of the pressure sensor P, the pedal stroke sensor 21a may be incorporated in another form or embodiment.

The rear-wheel hydraulic system of the brake actuator 25 has the same construction as the front-wheel hydraulic system as described above, and the oil passage Lr constituting the rear-wheel hydraulic system is composed of oil passages Lr1-Lr5 similarly to those of the oil passage Lf. The oil passage Lr is provided thereon with the aforementioned hydraulic control valve 41 similar to the hydraulic control valve 31 and a pressure regulation reservoir 44 similar to the pressure regulation reservoir 34. Branched oil passages Lr2, Lr2 communicating respectively with the wheel cylinders WC3, WC4 are provided thereon with the aforementioned pressure increasing control valves 42, 43 similar to the pressure increasing control valves 32, 33, and the oil passage Lr3 is provided with the aforementioned pressure reducing control valves 45, 46 similar to the pressure reducing control valves 35, 36 at portions thereof branched to be connected to the oil passages Lr2, Lr2. The oil passage Lr4 is provided thereon with the aforementioned pump 47, a safety valve 47a and a damper 48 similar to the pump 37, the safety valve 37a and the damper 138. Safety valves 42a, 43a similar to the safety valves 32a, 33a are provided in parallel relation respectively to the pressure increasing control valves 42, 43.

Thus, it is possible to make each wheel FL, FR, RL, RR generate a controlled hydraulic brake force by applying controlled hydraulic pressures, which are generated by driving the pumps 37, 47 and by controlling the hydraulic control valves 31, 41, respectively to the wheel cylinders WC1-WC4 of the wheels FL, FR, RL, RR.

Further, as shown in FIG. 1, the vehicle brake system is provided with wheel speed sensors Sfl, Sfr, Srl, Srr. The wheel speed sensors Sfl, Sfr, Sri, Srr are provided in the neighborhoods of the wheels FL, FR, RL, RR and output to the brake ECU 60 pulse signals of the frequencies respectively corresponding to the rotational speeds of the wheels FL, FR, RL, RR.

The brake ECU 60 is connected to the wheel speed sensors Sfl, Sfr, Srl, Srr, the pressure sensor P, the respective control valves 31-33, 35-36, 41-43 and 45-46, and the electric motor M. The brake ECU 60 has a microcomputer (not shown) composed of an input/output interface, a CPU, a RAM and a ROM (all not shown) which are mutually connected through bus lines. By executing cooperative control programs shown in FIGS. 4 and 5, the CPU controls the electric motor M of the hydraulic brake device B in response to detection signals from the aforementioned various sensors as well as to an actual regeneration execution value from the hybrid ECU 19 and also executes the switching control or the energization current control of the various control valves 31-33, 35-36, 41-43 and 45-46, thereby to control the controlled hydraulic pressures applied to the wheel cylinders WC1-WC4, that is, the controlled hydraulic brake forces applied to the wheels FL, FR, RL, RR. The RAM temporally stores variables necessary for the execution of the programs, and the ROM stores the aforementioned cooperative control programs (vehicle brake control programs).

The brake ECU 60 has beforehand stored in a storage device (storage means) 61 a map, a table or calculation expressions representing the relation between the brake operation state represented by the master cylinder pressure (or the stroke of the brake pedal 21) and a target total brake force which is to be applied to the wheels FL, FR, RL, RR in dependence on the brake operation state. Further, the storage device 61 has also beforehand stored therein a map, a table or calculation expressions representing the relation between the brake operation state represented by the master cylinder pressure and a base hydraulic brake force which is to be applied to the wheels FL, FR, RL, RR in dependence on the brake operation state. In addition, the storage device 61 has also beforehand stored therein a map, a table or calculation expressions representing the relation between the brake operation state represented by the master cylinder pressure and a target regenerative brake force which is to be applied to the wheels FL, FR, RL, RR in dependence on the brake operation state.

Further, the brake ECU 60 is connected to the hybrid ECU 19 to be able to communicate with each other and executes a cooperative control between the regenerative brake performed by the electric motor 12 and the hydraulic brake so that the total brake force given to the vehicle becomes equivalent to that given in a vehicle wherein the hydraulic brake only is performed. More specifically, the brake ECU 60 outputs to the hybrid ECU 19 a regenerative demand value, indicating a part of the total brake force which part should be undertaken by the regenerative brake upon a brake demand by the driver, that is, in dependence on a brake operation state, as a target demand value or a target regenerative brake force for the regenerative brake device. The hybrid ECU 19 derives an actual regeneration execution value which is to be actually applied as a regenerative brake, based on the regeneration demand value (target regenerative brake force) inputted thereto and taking the vehicle speed, the battery charging state and the liken into consideration and controls the electric motor 12 through the inverter 16 to generate a regenerative brake force corresponding to the actual regeneration execution value while outputting the derived actual regeneration execution value to the brake ECU 60.

Figure 3:
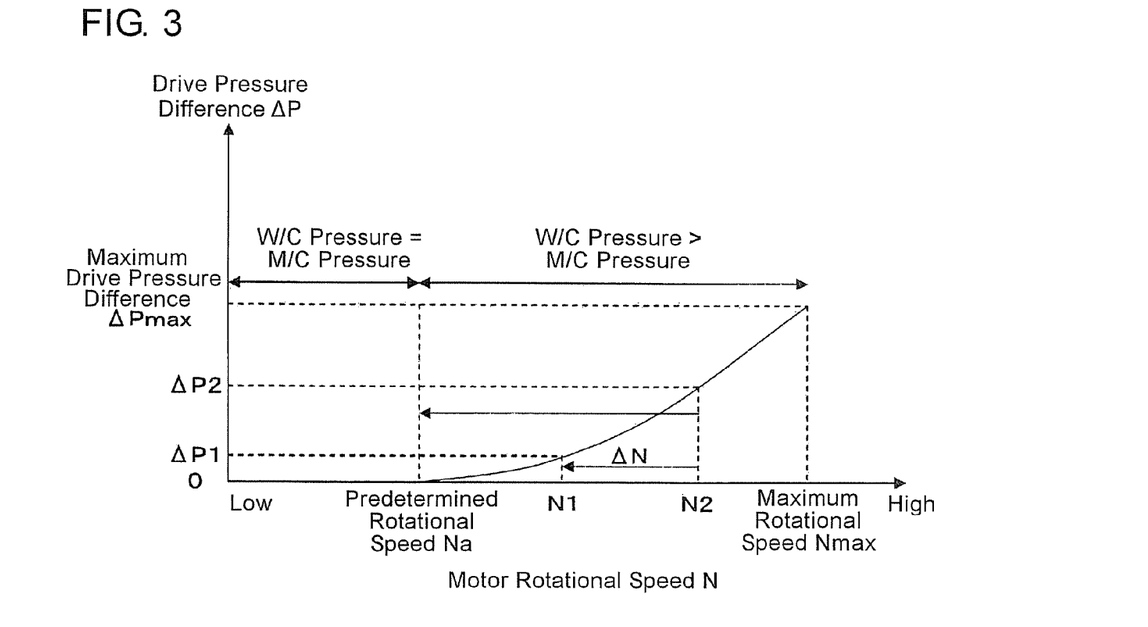
FIG. 3 is a graph showing the correlation between motor rotational speed and drive pressure difference.

The storage device 61 (storage means) stores the map or calculation expressions represented in FIG. 3. The map or the calculation expressions represent the relation between the rotational speed N (motor rotational speed) of the electric motor M of the hydraulic brake device B and a pressure difference $\Delta P$. The pressure difference $\Delta P$ is defined as follows. As mentioned earlier with reference to FIG. 8, when the pump 38 is driven by the operation of the electric motor 39 with a command being issued to the hydraulic control valve 32 to make the controlled pressure difference thereacross zero (i.e., in the case of the commanded controlled pressure difference being zero), the pressure on the wheel cylinder side of the hydraulic control valve 32 becomes higher than the pressure on the master cylinder side. Thus, if the wheel cylinder side pressure becomes higher by the predetermined pressure and over than the master cylinder side pressure, the valve hole 32a of the hydraulic control valve 32 serves as a throttle hole to generate a pressure difference between the master cylinder 25 side and the wheel cylinder 30 side of the hydraulic control valve 32. This generated pressure difference is the aforementioned drive pressure difference. If the difference of the wheel cylinder side pressure from the master cylinder side pressure is less than the predetermined pressure, the valve hole 32a of the hydraulic control valve 32 does not serve as a throttle hole, whereby no drive pressure difference is generated between the master cylinder 25 side and the wheel cylinder 30 side of the hydraulic control valve 32.

As apparent from this explanation, the aforementioned map is set so that the drive pressure difference $\Delta P$ becomes zero when the motor rotational speed N is lower than a predetermined rotational speed Na. Further, the map is set so that when the motor rotational speed N is equal to or higher than the predetermined rotational speed Na, the drive pressure difference $\Delta P$ increases as the motor rotational speed N increases. A maximum drive pressure difference $\Delta P$max is set for a maximum rotational speed Nmax of the electric motor M. The predetermined rotational speed Na is defined to be a motor rotational speed N which does not cause the drive pressure difference to be generated. When the motor rotational speed N is less than the predetermined rotational speed Na, the wheel cylinder pressure (W/C pressure) remains same as the master cylinder pressure (M/C pressure). When the motor rotational speed N is equal to or higher than the predetermined rotational speed Na, on the contrary, the wheel cylinder pressure (W/C pressure) becomes a pressure value which is made by adding the drive pressure difference $\Delta P$ to the master cylinder pressure (M/C pressure).

(Operation)

Next, the basic operation of the vehicle brake system as constructed above will be described. The brake ECU 60 inputs the master cylinder pressure representing the brake operation state from the pressure sensor P at predetermined time intervals. Then, by reference to the map, the brake ECU 60 calculates a target total brake force Ftb*(n) and a target regenerative brake force Frb*(n) which correspond to the master cylinder pressure. The hydraulic brake device B applies a base hydraulic brake force corresponding to the master cylinder pressure, while the regenerative brake device A applies a regenerative brake force corresponding to the target regenerative brake force Frb*(n). Thus, a total brake force which is made by adding the regenerative brake force to the base hydraulic brake force, is applied to the wheels.

Further, it may be the occasion that a controlled hydraulic brake force is applied in combination with a base hydraulic brake force and a regenerative brake force. On this occasion, a target total brake force Ftb*(n) and a target regenerative brake force Frb*(n) which correspond to the master cylinder pressure are calculated by reference to the map having been stored in advance. Then, as described later in detail, a difference between the target regenerative brake force Frb*(n) and an actual regenerative brake force Frb_act(n) is calculated as a target controlled hydraulic brake force Fcfb*(n). The regenerative brake device A applies the actual regenerative brake force Frb_act(n) which the regenerative brake device A is able to apply actually when instructed to apply the target regenerative brake force Frb*(n), while the hydraulic brake device B applies the base hydraulic brake force corresponding to the master cylinder pressure and the target controlled hydraulic brake force Fcfb*(n) which corresponds to the difference between the target regenerative brake force Frb*(n) and the actual regenerative brake force Frb_act(n). Thus, the total brake force which is made by adding the controlled hydraulic brake force and the regenerative brake force to the base hydraulic brake force is applied to the wheels.

Next, the controlled hydraulic brake force control in the vehicle brake system as constructed above will be described in accordance with flow charts shown in FIGS. 4 and 5. Description will be made by taking as an example the case that the total brake force is composed of a base hydraulic brake force and a regenerative brake force wherein because of an actual regenerative brake force being insufficient relative to a target regenerative brake force, a controlled hydraulic brake force is used to compensate for such an insufficient part of the regenerative brake force.

When for example an ignition switch (not shown) of the vehicle is held in ON-state, the brake ECU 60 executes the programs corresponding to the aforementioned flow charts at the intervals of a predetermined short-time T. The brake ECU 60 inputs a master cylinder pressure representing the brake operation state from the pressure sensor P (step 102) and calculates a target regenerative brake force Frb*(n) corresponding to the inputted master cylinder pressure (step 104). At this time, the brake ECU 60 uses the map, table or calculation expressions stored in advance and representing the relation between the master cylinder pressure or the brake operation state and the target regenerative brake force to be applied to the wheels FL, FR, RL, RR.

When the target regenerative brake force Frb*(n) is greater than zero (YES at step 106), the brake ECU 60 outputs the target regenerative brake force Frb*(n) calculated at step 104 to the hybrid ECU 19 (step 108). Thus, the hybrid ECU 19 inputs a regenerative demand value indicative of the target regenerative brake force Frb*(n) and controls the electric motor 12 through the inverter 16 to make the electric motor 12 generate a regenerative brake force based on the regenerative demand value and with the vehicle speed and the battery charging state taken into consideration while outputting an actual regeneration execution value to the brake ECU 60.

Accordingly, with the brake pedal 12 being stepped (i.e., with the brake operation being performed), with the target controlled hydraulic brake force Fcfb*(n) being zero and with the target regenerative brake force Frb*(n) being greater than zero, the regenerative brake force only is add to the base hydraulic brake force to apply the sum to the wheels FL, FR, RL, RR.

Further, the brake ECU 60 compensates for the difference between the target regenerative brake force Frb*(n) and the regenerative brake force (actual regenerative brake force) Frb_act(n) which is being actually applied by the regenerative brake device A to any of the wheels FL, FR, RL, RR (steps 110-116).

More specifically, the brake ECU 60 inputs from the hybrid ECU 19 the actual regeneration execution value indicative of the actual regenerative brake force Frb_act(n) which the regenerative brake device A is actually applying to any of the wheels FL, FR, RL, RR when inputting the target regenerative brake force Frb*(n) calculated at step 104 (step 110). The brake ECU 60 then calculates the difference between the target regenerative brake force Frb*(n) calculated at step 104 and the actual regenerative brake force Frb_act(n) inputted at step 110 (step 112). Thus, the brake ECU 60 detects the fluctuation in the regenerative brake force if the calculated difference is greater than a predetermined value (a) (step 114).

When detecting the fluctuation in the regenerative brake force, the brake ECU 60 makes a judgment of YES at step 114 and executes a controlled hydraulic brake force control at step 116. Specifically, the brake ECU 60 executes a controlled hydraulic brake force control subroutine shown in FIG. 5.

Each time this subroutine is initiated at step 200, the brake ECU 60 calculates a target controlled hydraulic brake force Fcfb*(n) as a controlled hydraulic pressure command value (step 202). That is, the brake ECU 60 sets the difference calculated at step 112 as the target controlled hydraulic brake force Fcfb*(n). Then, the brake ECU 60 calculates a gradient ΔFcfb(n) of the target controlled hydraulic brake force Fcfb* based on a target controlled hydraulic brake force Fcfb*(n−1) calculated in a preceding processing and the target controlled hydraulic brake force Fcfb*(n) calculated in the present processing (step 204). In a modified form, the gradient ΔFcfb(n) may be calculated not only by using the values in the present processing and the preceding processing but also by using the values in a plural number of the past processing.

When the gradient of the target controlled hydraulic brake force Fcfb* (the controlled hydraulic pressure command value) is downhill or is not present, that is, when the gradient ΔFcfb(n) is minus or zero, the brake ECU 60 makes a judgment of YES at step 206 and sets the motor rotational speed to a smaller rotational speed than that corresponding to the target controlled hydraulic brake force Fcfb* (step 208).

The manners of decreasing the rotational speed are as follows. For example, the brake ECU 60 alters the rotational speed to that smaller by a predetermined rotational speed ΔN. As shown in FIG. 3, the rotational speed N2 is decreased by the predetermined rotational speed ΔN to a rotational speed N1. It is preferable that the rotational speed N1 is equal to or greater than a rotational speed corresponding to the discharge pressure of the pumps 37, 47 which is necessary to generate the controlled hydraulic pressure.

Further, when the rotational speed is N2 which is higher than the predetermined rotational speed Na, the brake ECU 60 alters the rotational speed to the predetermined rotational speed Na, as shown in FIG. 3. Thus, when a command has been issued to the hydraulic control valves 31, 41 to make zero the control pressure difference thereacross, it can be realized to decrease the rotational speed of the motor M so that the hydraulic pressure generated by driving the pumps 37, 47 does not cause the drive pressure difference to be generated between the master cylinder side and the wheel cylinder side of each hydraulic control valve 31, 41.

Further, where it is required to provide a restriction on the quantity of the drive pressure difference ΔP to be decreased, the brake ECU 60 derives a motor rotational speed corresponding to the restricted quantity by the use of the map shown in FIG. 3, so that the motor rotational speed can be decreased in dependence on the restricted quantity.

Further, the brake ECU 60 may make the motor rotational speed variable in dependence on the gradient of the target controlled hydraulic brake force Fcfb* to be given to the hydraulic brake device B. In this case, the brake ECU 60 uses a map, a table or calculation expressions which have been stored in advance to represent the relation between the motor rotational speed and the target controlled hydraulic brake force Fcfb*.

Then, the brake ECU 60 drives the electric motor M at the motor rotational speed so set to drive the pumps 37, 47 and at the same time, applies an electric current to the hydraulic control valves 31, 41 so that the hydraulic pressure of brake fluid supplied from the pumps 37, 47 to the wheel cylinders WC1-WC4 comes to correspond to the target controlled hydraulic brake force Fcfb* (step 212). As a consequence, the hydraulic brake device B applies a controlled hydraulic brake force component of the total brake force to the wheels FL, FR, RL, RR.

On the other hand, when the gradient of the target controlled hydraulic brake force Fcfb* (the controlled hydraulic pressure command value) is uphill, that is, when the gradient ΔFcfb(n) is plus, the brake ECU 60 makes a judgment of NO at step 206 and sets the motor rotational speed to a rotational speed corresponding to the target controlled hydraulic brake force Fcfb* (step 210). In this case, the brake ECU 60 uses the map, table or calculation expressions which have been stored in advance to represent the relation between the motor rotational speed and the target controlled hydraulic brake force Fcfb*. Then, the brake ECU 60 controls the pumps 37, 47 and the hydraulic control valves 31, 41 in the same manner as described above (step 212), whereby the hydraulic brake device B applies a controlled hydraulic brake force component of the total brake force to the wheels FL, FR, RL, RR.

Figure 4:
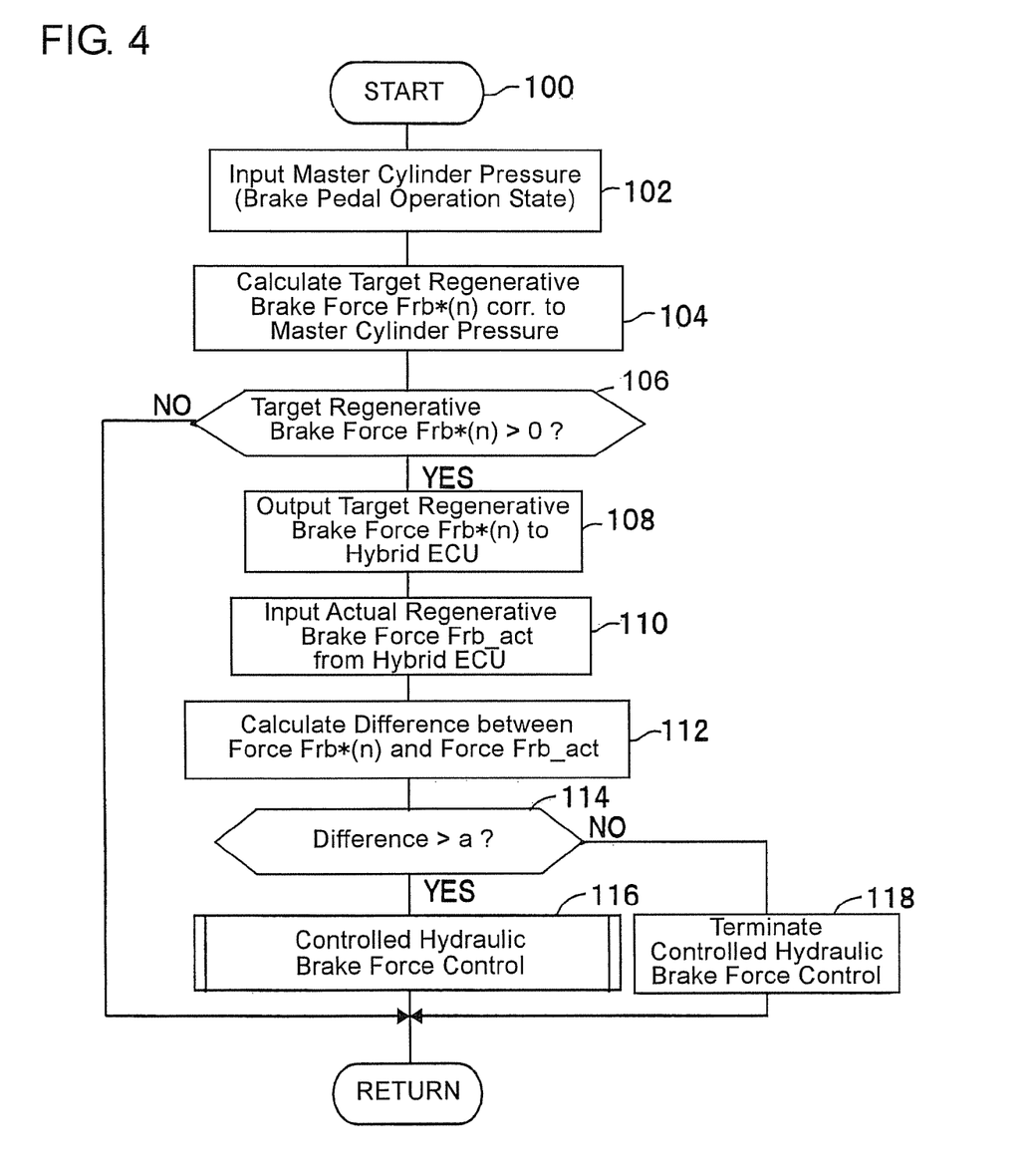
FIG. 4 is a flow chart of a control program executed by a brake ECU shown in FIG. 1.
Figure 5:
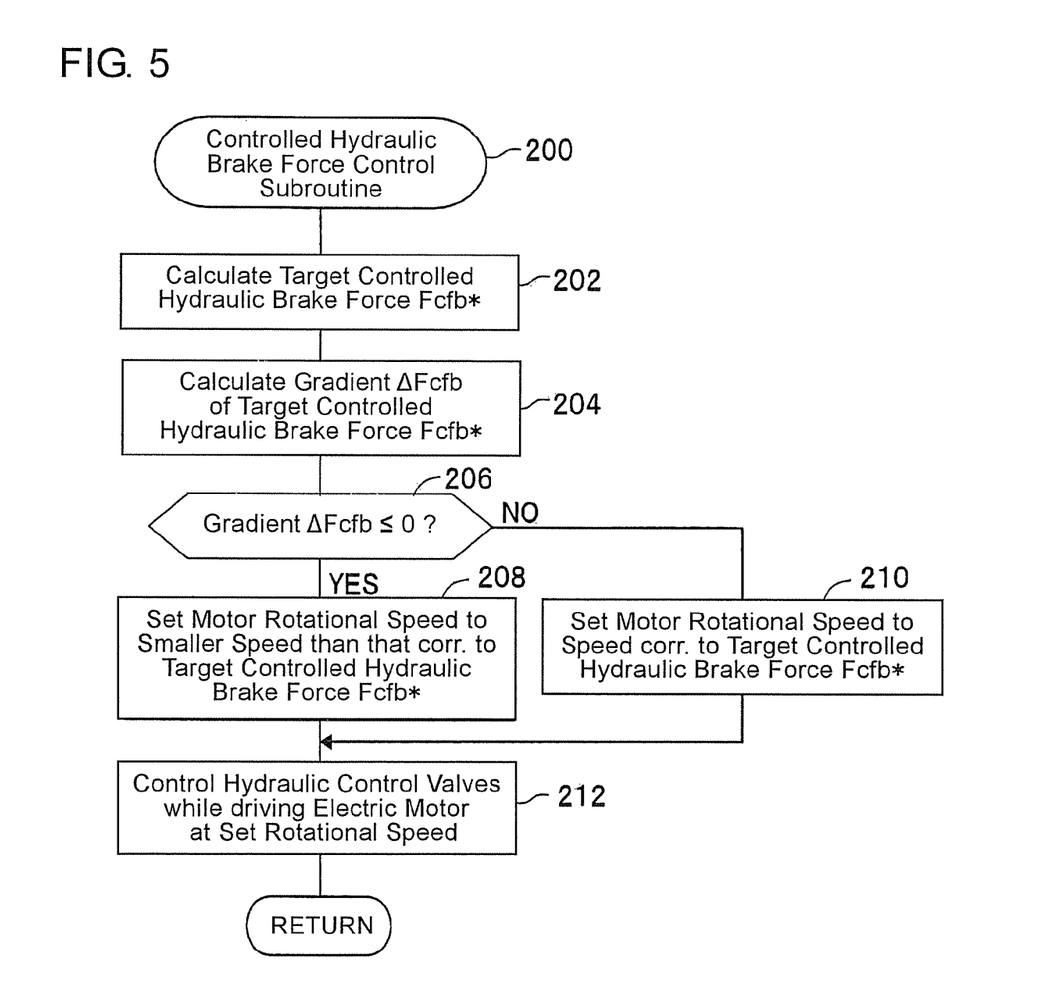
FIG. 5 is a flow chart of a subroutine constituting a part of the control program shown in FIG. 4.

Upon termination of the processing for the controlled hydraulic brake force control subroutine shown in FIG. 5, the brake ECU 60 returns the program to that shown in FIG. 4 to terminate the program of FIG. 4 temporarily.

Further, unless detecting the fluctuation in the regenerative brake force (i.e., if the difference between the target regenerative brake force Frb*(n) and the actual regenerative brake force Frb_act(n) is zero), the brake ECU 60 makes a judgment of NO at step 114 and discontinues the controlled hydraulic brake force control which has been executed in accordance with the aforementioned controlled hydraulic brake force control subroutine (step 118). Thereafter, the brake ECU 60 terminates the program shown in FIG. 4 temporarily.

Controlling the controlled hydraulic brake force (step 116) upon detection of the fluctuation in the regenerative brake force at step 114 means, in other words, executing the controlled hydraulic brake force control for changing the rotational speed of the motor M when at least both of the regenerative brake force and the controlled hydraulic brake force are being applied.

Figure 6:
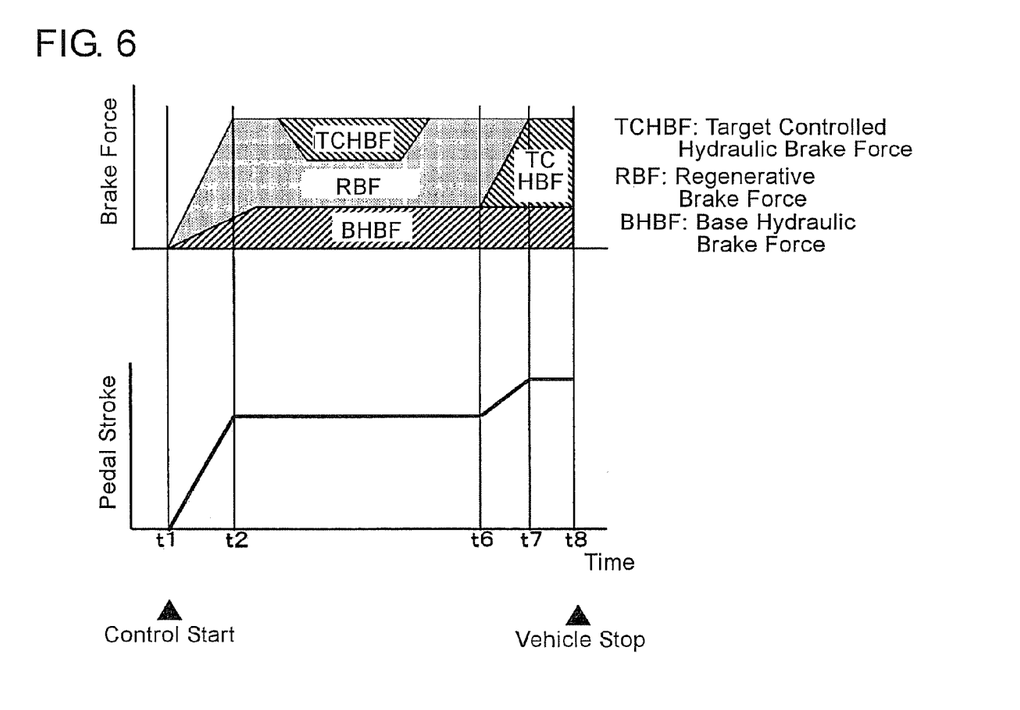
FIG. 6 is a time chart showing the relation between the composition of brake forces during a cooperative regenerative braking and the stroke of a brake pedal.

In the aforementioned vehicle brake system, as shown in FIG. 6, the driver begins to step the brake pedal 21 at a time point t1 on the traveling of the vehicle. The brake pedal 21 is moved at a suitable stepping speed until a time point t2, and the stepping amount of the brake pedal 21 is held constant from the time point t2 until a time point t6. For the period from the time point t1 to the time point t6, a base hydraulic brake force (the right-ascending oblique line portion labeled "BHBF" in FIG. 6) and a regenerative brake force (the gray-masked portion labeled "RBF" in FIG. 6) are basically applied to the wheels FL, FR, RL, RR (cooperative regenerative brake).

Figure 7:
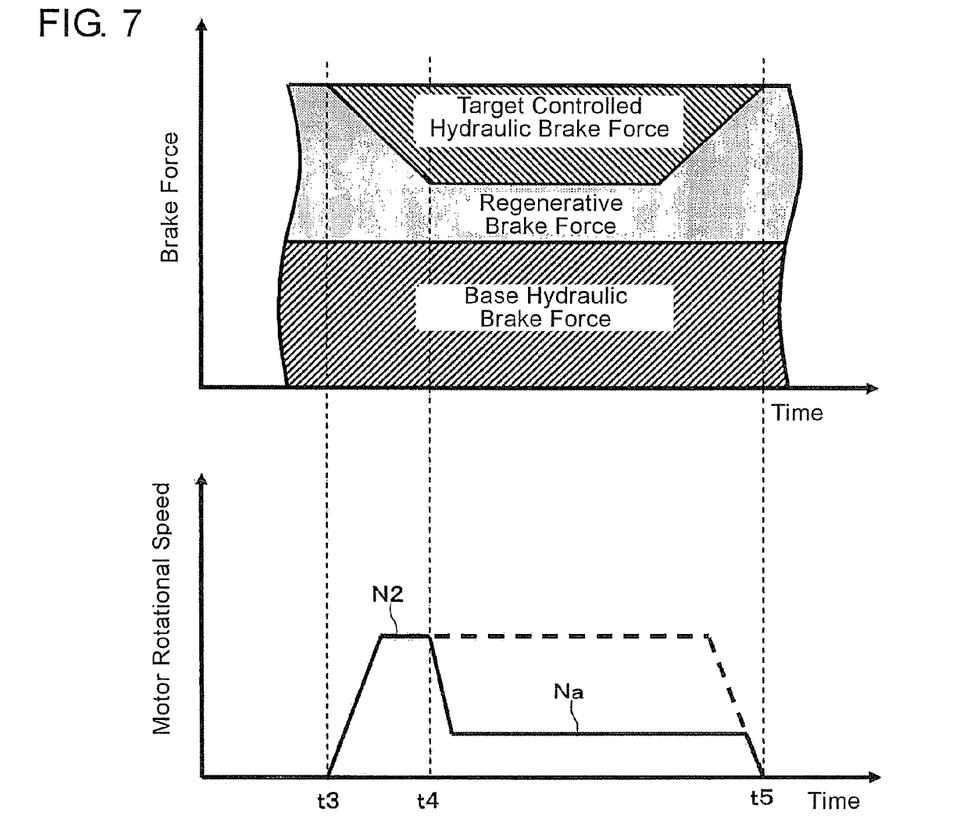
FIG. 7 is another time chart in an enlarged scale of a part of the time chart shown in FIG. 6, particularly showing the detail of the relation between regenerative brake force, controlled hydraulic brake force and motor rotational speed.

However, when the actual regenerative brake force Frb_act is less than the target regenerative brake force Frb* as is the case of the battery being in a fully charged state or the like, the controlled hydraulic brake force compensates for the difference. This compensation by the controlled hydraulic brake force is being performed within the period from the time point t2 to the time point t6. That is, as shown in FIG. 7 in an enlarged scale, the compensation by the controlled hydraulic brake force is being performed for the period from a time point t3 to a time point t5.

When the gradient of the target controlled hydraulic brake force Fcfb* (the controlled hydraulic pressure command value) is uphill, that is, when the gradient ΔFcfb(n) is plus, the brake ECU 60 makes a judgment of NO at step 206 and sets the motor rotational speed to the rotational speed N2 corresponding to the target controlled hydraulic brake force Fcfb* (step 210).

Then, when the gradient of the target controlled hydraulic brake force Fcfb* (the controlled hydraulic pressure command value) becomes absent, that is, when the gradient ΔFcfb(n) becomes zero, a judgment of YES is made at step 206, and the motor rotational speed is set to a smaller rotational speed than that corresponding to the target controlled hydraulic brake force Fcfb* (step 208). In this case, the motor rotational speed N being N2 is set to the predetermined rotational speed Na.

Further, when the gradient of the target controlled hydraulic brake force Fcfb* (the controlled hydraulic pressure command value) becomes downhill, that is, when the gradient ΔFcfb(n) becomes minus, the judgment of YES is made at step 206, and the motor rotational speed is set to a smaller rotational speed than that corresponding to the target controlled hydraulic brake force Fcfb* (step 208). In this case, since the motor rotational speed N has already been set to the predetermined rotational speed Na, the same rotational speed Na is maintained if the pressure by driving the pumps 37, 47 is necessary, but the rotational speed N is further decreased if not necessary.

In this manner, since for the period from the time point t4 to the time point t5, the motor rotational speed N is decreased to the predetermined rotational speed Na at which the drive pressure difference ΔP is not generated, the pumps 37, 47 are driven by the driving of the electric motor M at the constant rotational speed Na which suppresses the difference of the pressure on the wheel cylinder side from the pressure on the master cylinder side to be less than the predetermined pressure. Therefore, the generation of the drive pressure difference ΔP can be suppressed, whereby it results that the target controlled hydraulic brake force to which an additional force corresponding to the drive pressure difference ΔP is not added is applied to the wheels FL, FR, RL, RR.

Further, by decreasing the motor rotational speed to reduce the generated drive pressure difference ΔP, the same which would otherwise be added can also be suppressed to be as small as possible, whereby the actually applied controlled hydraulic brake force can be applied as a brake force which is as close as possible to a brake force set as target.

Then, when the target controlled hydraulic brake force Fcfb* becomes zero in the end, that is, when the aforementioned difference becomes zero, the brake ECU 60 makes a judgment of NO at step 114 and stops the controlled hydraulic brake force control which has been executed in accordance with the aforementioned controlled hydraulic brake force control subroutine (step 118).

Then, when the vehicle speed V is reduced to an alteration initiating vehicle speed Va (the time point t6), the brake ECU 60 initiates a brake force alteration control (i.e., a so-called "replacement control") for gradually switching the regenerative brake force to the controlled hydraulic brake force. Subsequently, when the vehicle speeds V is further reduced to an alteration terminating vehicle speed Vb (the time point t7), the brake ECU 60 terminates the brake force alteration control by stopping the application of the regenerative brake force. Subsequent to the time point t7, the base hydraulic brake force and the controlled hydraulic brake force are applied to the wheels FL, FR, RL, RR, whereby the vehicle is stopped finally (the time point t8).

As is clear from the foregoing description, in the present embodiment, the brake ECU 60 serving as controlled hydraulic brake force control means decreases the rotational speed of the electric motor M when at least both of the regenerative brake force and the controlled hydraulic brake force are being applied. Therefore, without adding a brake force component attributed to the drive pressure difference to a controlled hydraulic brake force set as target or by suppressing the added brake force component attributed to the drive pressure difference to be as small as possible, the controlled hydraulic brake force which is applied actually can be controlled to be a brake force set as target or to be a such a brake force as close as possible to that set as target. Accordingly, since the regenerative brake force can be applied with a brake force which it should undertake in dependence on the operation state of the brake pedal 21 or with that which is as close as possible to such a brake force, the efficiency in utilizing the regenerative energy can be enhanced when at least both of the regenerative brake force and the controlled hydraulic brake force are applied.

Further, the brake ECU 60 serving as controlled hydraulic brake force control means decreases the rotational speed N of the electric motor M when the gradient of the target controlled hydraulic brake force being a controlled hydraulic pressure command value to the hydraulic brake device B is downhill or is not present. Thus, when the gradient of the target controlled hydraulic brake force is uphill, it becomes possible to increase the supply pressures from the pumps 37, 47 quickly without decreasing the motor rotational speed N and to supply the controlled hydraulic brake force as quickly as possible. On the contrary, when the gradient of the controlled hydraulic pressure command value is downhill or is not present because of low in demand for the supply pressures from the pumps 37, 47, it is possible to decrease the motor rotational speed. Accordingly, the efficiency in utilizing the regenerative energy can be enhanced timely without harming the quick supply of the controlled hydraulic brake force.

Further, the hydraulic control valves 31, 41 are electromagnetic valves which are switchable selectively to the pressure difference state that a controlled pressure difference is generated between the master cylinder side and the wheel cylinder side and the direct communication state that no controlled pressure difference is generated therebetween, and when a command is issued for making the hydraulic control valves 31, 41 generate the controlled pressure difference of zero, the brake ECU 60 serving as controlled hydraulic brake force control means decreases the rotational speed N of the electric motor M by reference to the map representing the relation between the rotational speed N of the electric motor M and the drive pressure difference ΔP which the hydraulic pressure generated by driving the pumps 37, 47 causes to be generated between the master cylinder side and the wheel cylinder side of each hydraulic control valve 31, 41. Thus, it becomes possible to decrease the motor rotational speed easily and properly.

Further, the hydraulic control valves 31, 41 are electromagnetic valves which are switchable selectively to the pressure difference state that a controlled pressure difference is generated between the master cylinder side and the wheel cylinder side and the direct communication state that no controlled pressure difference is generated therebetween, and when a command is issued for making the hydraulic control valves 31, 41 generate the controlled pressure difference of zero, the brake ECU 60 serving as controlled hydraulic brake force control means decreases the rotational speed of the electric motor M so that the hydraulic pressure generated by driving each of the pumps 37, 47 does not cause the drive pressure difference ΔP to be generated between the master cylinder side and the wheel cylinder side of each hydraulic control valve 31, 41. Thus, the controlled hydraulic brake force which is actually applied can be controlled to a brake force set as target without adding any brake force attributed to the drive pressure difference ΔP to the controlled hydraulic brake force set as target. Accordingly, since the regenerative brake force can be applied with a brake force which it should undertake in dependence on the operation state of the brake pedal 21, the efficiency in utilizing the regenerative energy can be enhanced when at least both of the regenerative brake force and the controlled hydraulic brake force are applied.

Further, the brake ECU 60 serving as controlled hydraulic brake force control means makes the rotational speed N of the electric motor M variable in correspondence to the gradient of the target controlled hydraulic brake force being the controlled hydraulic pressure command value to the hydraulic brake device B. Thus, it becomes possible to decrease the motor rotational speed further properly with the gradient of the controlled hydraulic pressure command value being taken into consideration.

In the foregoing embodiment, the piping in the front-rear separation form is arranged in a front-engine front-drive vehicle. In a modified form, the piping in the front-rear separation form may be arranged in a front-engine rear-drive vehicle. In the foregoing embodiment, the vacuum booster is used as a booster device. In a modified form, there may be used a booster device of the type that accumulates the hydraulic pressure generated by a pump to boost the force by utilizing the accumulated hydraulic pressure.

Obviously, numerous modifications and variations of the present invention are possible in light of the above teachings. It is therefore to be understood that within the scope of the appended claims, the present invention may be practiced otherwise than as specifically described herein.

What is claimed is:

1. A vehicle brake system comprising:
a hydraulic brake device for generating by a master cylinder a base hydraulic pressure corresponding to a braking operation and for applying the generated base hydraulic pressure to wheel cylinders of wheels which are connected to the master cylinder through fluid passages having a hydraulic control valve to generate a base hydraulic brake force on the wheels, the hydraulic brake device being provided also for driving a pump by driving an electric motor in dependence on a controlled hydraulic pressure command value to generate and apply a controlled hydraulic pressure to the wheel cylinders and to generate a controlled hydraulic brake force on the wheels; the hydraulic control valve being an electromagnetic valve which is switchable between a pressure difference state in which a controlled pressure difference is generated between the master cylinder side and the wheel cylinder side and a direct communication state in which the controlled pressure difference is not generated between the master cylinder side and the wheel cylinder side;
a regenerative brake device for generating a regenerative brake force corresponding to the state of the braking operation, on any of the wheels;
gradient calculation means for calculating a gradient as a time-dependent fluctuation of the controlled hydraulic pressure command value:
a map representing a relation between a rotational speed of the electric motor and a drive pressure difference which the hydraulic pressure, generated by driving of the pump, causes to be generated between a master cylinder side of the hydraulic control valve and a wheel cylinder side of the hydraulic control valve; and
controlled hydraulic brake force control means for decreasing the rotational speed of the electric motor as specified by the map when at least both of the regenerative brake force and the controlled hydraulic brake force are applied, when the gradient of the controlled hydraulic pressure command value given to the hydraulic bake device is downhill or is not present, and when a command is issued to the hydraulic control valve to make the controlled pressure difference across the hydraulic control valve zero.

2. The vehicle brake system as set forth in claim 1, wherein when the gradient of the controlled hydraulic pressure command value given to the hydraulic brake device is downhill or not present and when a command is issued to the hydraulic control valve to make the controlled pressure difference across the hydraulic control valve zero, the controlled hydraulic brake force control means determines, as specified by the map, a specified rotational speed of the electric motor which does not cause the hydraulic control valve to generate the drive pressure difference, and decreases the rotational speed of the electric motor to the specified rotational speed.

3. The vehicle brake system as set forth in claim 1, wherein when the gradient of the controlled hydraulic pressure command value given to the hydraulic brake device is downhill or not present, when the command is issued to the hydraulic control valve to make the controlled pressure difference across the hydraulic control valve zero and when the drive pressure difference is not to be decreased below a specified quantity, the controlled hydraulic brake force control means determines, as specified by the map, a specified rotational speed of the electric motor which depends on the specified quantity, and decreases the rotational speed of the electric motor to the specified rotational speed.

* * * * *